(No Model.) 6 Sheets—Sheet 2.

W. S. SMITH & E. R. BULLOCK.
BOX COVERING MACHINE.

No. 588,887. Patented Aug. 24, 1897.

Fig. 2.

Witnesses,
John H. Pilling
V. Stukely Westcott.

Inventors.
W. Scott Smith
Edwin R. Bullock
By E. R. Bullock atty.

(No Model.) 6 Sheets—Sheet 3.

W. S. SMITH & E. R. BULLOCK.
BOX COVERING MACHINE.

No. 588,887. Patented Aug. 24, 1897.

Witnesses,
V. Stukely Westcott.
John H. Pilling.

Inventors.
W. Scott Smith
Edwin R. Bullock
Per E. R. Bullock Atty.

(No Model.) 6 Sheets—Sheet 4.

W. S. SMITH & E. R. BULLOCK.
BOX COVERING MACHINE.

No. 588,887. Patented Aug. 24, 1897.

Witnesses,
John H. Pilling.
V. Stukely Westcott.

Inventors.
W. Scott Smith
Edwin R. Bullock
By E. R. Bullock atty.

(No Model.) 6 Sheets—Sheet 5.

W. S. SMITH & E. R. BULLOCK.
BOX COVERING MACHINE.

No. 588,887. Patented Aug. 24, 1897.

Witnesses,
V. Stukely Westcott.
John H. Pilling.

Inventors.
W. Scott Smith
Edwin R. Bullock
By E. R. Bullock atty.

UNITED STATES PATENT OFFICE.

WINFIELD SCOTT SMITH AND EDWIN R. BULLOCK, OF PAWTUCKET, RHODE ISLAND.

BOX-COVERING MACHINE.

SPECIFICATION forming part of Letters Patent No. 588,887, dated August 24, 1897.

Application filed November 25, 1896. Serial No. 613,468. (No model.)

*To all whom it may concern:*

Be it known that we, WINFIELD SCOTT SMITH and EDWIN R. BULLOCK, citizens of the United States, residing at Pawtucket, in the county of Providence and State of Rhode Island, have invented certain new and useful Improvements in Box-Covering Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the covering of boxes, and applies more particularly to that class of light boxes known as "paper boxes."

It has for its object the reduction of cost in the manufacture of such boxes, and the machine about to be described and which embodies this invention fully accomplishes this object.

A person by the use of this machine can cover several times as many boxes in a given time as he can do by hand, and the quality of the work will be more uniform.

This invention does not concern itself with the cutting or setting up of the box, but starts with the box already set up and having its corners stayed. This preliminary work may be done by either of the methods now employed for setting up and staying boxes.

Starting then with the rough box this invention enables a person to completely cover the box at one operation with a single piece of covering material and to do the same very quickly and very well.

We are aware of the existence of machines which partially cover a box by winding a strip of paper onto it from a reel, and we know, too, that machines are used to apply staystrips and labels to boxes. The machine which embodies our invention, however, goes further than these and completely covers the box, using for the purpose a single covering-piece, of paper or other suitable material, upon which all designs and labels have previously been printed. It will thus be seen that a single impression prints all the labels in preparing covers to be used by this method, and since the labels and designs are all on a single piece of covering material they are all applied to the box at a single operation, and a considerable saving in time is thus effected.

This machine consists principally of the following parts, namely: a table having an opening in its top wide enough to receive the box and long enough to receive the extended covering for the box; a presser-block in the center of this opening supported upon the end of a spiral spring or other yielding device; a vertically-reciprocating plunger in two parts, one part fixed to the end of plunger-rod and the other, called the "follower," adapted to slide upon the rod, (said plunger working against the said presser-block presents the box to the various covering devices and supports its sides during the operation of these devices;) a pair of yielding rolls for covering the sides of the box; devices for turning the outer flaps onto the ends of the box; a second pair of yielding rolls for turning the center flaps onto the ends of the box; devices for turning the edge of covering material inwardly over the edges of the box, and a knocking-off device to remove the finished box from the plunger at the end of its return stroke. These parts, together with the mechanism by which they are actuated, chiefly constitute this invention.

Boxes covered by this machine can be produced at a much lower cost than similar boxes covered by hand, and they are superior to hand-covered boxes from the fact of their having a uniform appearance and square corners.

Referring now to the drawings, in which similar numerals refer to similar parts throughout the several views.

The base 1, the guide-tube 2, rising therefrom, the spider 3, whose hub is secured to tube 2, the guide-post 4, supporting the table 5, and the upper guide-post 6, rising from the table, constitute the framework of the machine.

In the bearings 7 and 8 turns the shaft 9, carrying the driving-pulley 10, the clutch whose fixed hub 11 has one or more arms (in this case two) provided with projecting pins 12 12, and the loose sleeve 13, carrying the bolt 14, designed to engage with the pins 12 12 in driving the machine. The sleeve 13 carries also the bevel-pinion 15, to which it is keyed, and the spring 16, which acts to engage bolt 14 with a pin 12.

17 is a cam which acts upon bolt 14 to disengage the clutch at each revolution of cam 29 or (as here geared) at every third revolution of driving-shaft 9. The driving-pulley 10, shaft 9, and hub 11 run continuously.

In starting the machine cam 17 is depressed by the foot acting upon the treadle 18 and through the arms 19 and 20 of the lever 21 working against spring 22. Cam 17 is carried upon the guide-rod 23, having lugs 24 and 25. When arm 20 acts upon lug 25 to depress arm 17, lug 24 is also depressed, and the arm 26, actuated by spring 27, swings into the path of lug 24 and is there stopped by pin 28. Cam 17 is thus locked below the path of bolt 14 during two out of every three revolutions of the driving-shaft.

29 is the cam which actuates the various covering devices of the machine. Its type is immaterial to our purpose, but a cylindrical cam is here shown. Its hub 30 is loosely sleeved upon the guide-tube 2 and supported vertically by the base 1 of the machine. Hub 30 carries the bevel-gear 31, which meshes with and is driven by pinion 15.

32 is a connecting-rod sliding in ways secured to the guide-post 4 and the upper guide-post 6. Its lower end carries the antifriction-roll 33, adapted to run in the groove 34 of cam 29, which imparts to the guide-rod an intermittent motion. The upper end of connecting-rod 32, Figs. 2 and 3, carries an arm 35, to whose outer end is secured the tube 36. The axis of this tube and that of guide-tube 2 lie in the same vertical line. Tube 36 carries at its lower end the block 37, whose horizontal dimensions suit the inside of box to be covered. Telescoped upon tube 36 is the tube 38, which carries the follower 39, having the same horizontal dimensions as block 37. The combined thickness of block and follower should be a little more than the depth of the box to be covered. It will be seen by the construction that tube 36 carries block 37 to the end of its stroke, the follower 39 remaining in contact with 37 to a point near the end, where its downward motion is stopped and the block 37 continues alone, carrying the box $a$ with it. On its return stroke block 37 again takes up the follower 39 and returns it to the starting-point. This is accomplished as follows:

40 is a bracket from guide-post 6. From its outer end hangs a rod 41, whose upper end is threaded and fitted with check-nuts, one above and the other below said bracket, for adjustment of its length.

Rod 41 is adjustably suspended at its upper end from the stationary arm 40 by means of its threaded end and suitable check-nuts. Its lower end is enlarged.

42 is an extension-rod lying parallel with rod 41. Its upper end is wrapped around rod 41 and is designed to slide upon it. The enlarged lower end of rod 41 serves to stop the movement of rod 42.

43 is a pin passing through a plug at the lower end of rod 42 and is fixed in the sides of follower-tube 38. Pin 43 extends through the tube 36, whose sides are slotted at 44 to allow it longitudinal movement.

45 is a spring, used under tension, connecting rod 42 through the pin 43 with the block 37 through the adjusting-screw 46.

The function of rods 41 and 42, pin 43, slots 44, spring 45, and adjusting-screw 46 is to detain the follower 39 when the plunger nears the end of its stroke, so that the sides of the box-covering material may be turned over into the box by the turning-in pieces (yet to be described) and pasted to the inner sides of box by the follower 39.

Figure 2:
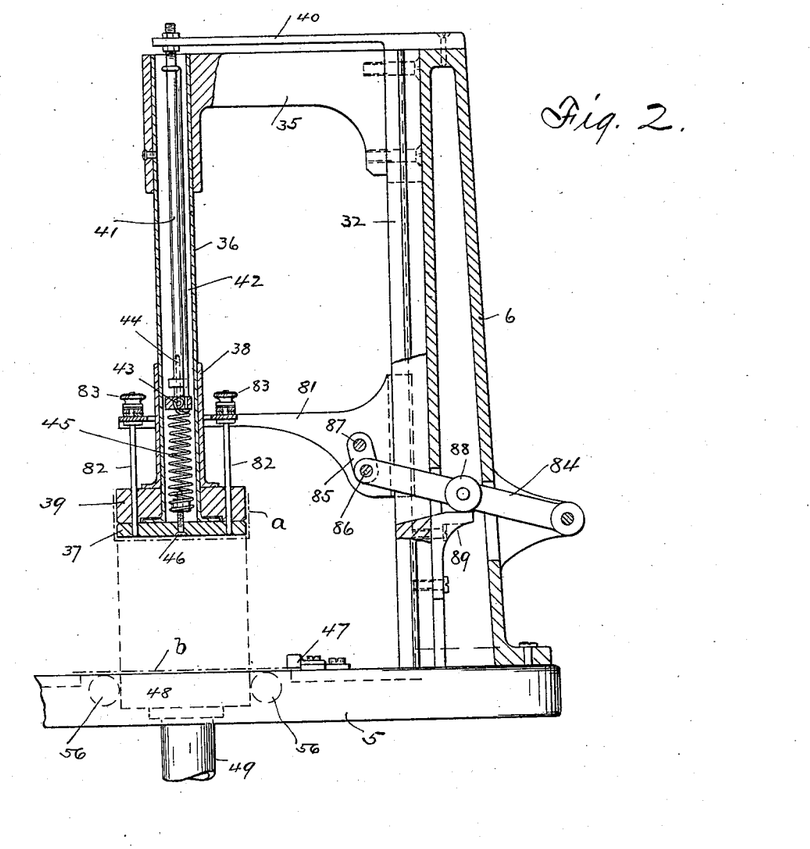
Fig. 2, a vertical section through the upper part of the machine in the same plane.

In Fig. 2, $a$ shows a rough box in place upon the "plunger," (which we will call block 37 and follower 39 when taken together,) and $b$ shows a piece of the covering material in place upon the table.

47 is a gage for locating the paper $b$ upon the table and is fully adjustable. Screws 100 100, passing through slots in gage 47 and into table 5, provide for the lateral adjustment of the gage, and the slotted arm 101, secured to gage 47 by the screw 102, provides for longitudinal adjustment.

48 is what may be called a "presser-block" and has the same size as the plunger above it. It serves to fill the otherwise open space in center of the table, and upon it the covering material is laid. It is carried upon the upper end of a tube 49, telescoped in guide-tube 2. It is pressed upward by the spring 50 in the tube 49 and resting upon a support 51, rising from the base of the machine. Pin 52, passing through slots in the tube 49, limits its upward movement.

53 is an air-vent.

Figures 9, 10, 11, 12, 13, 16:
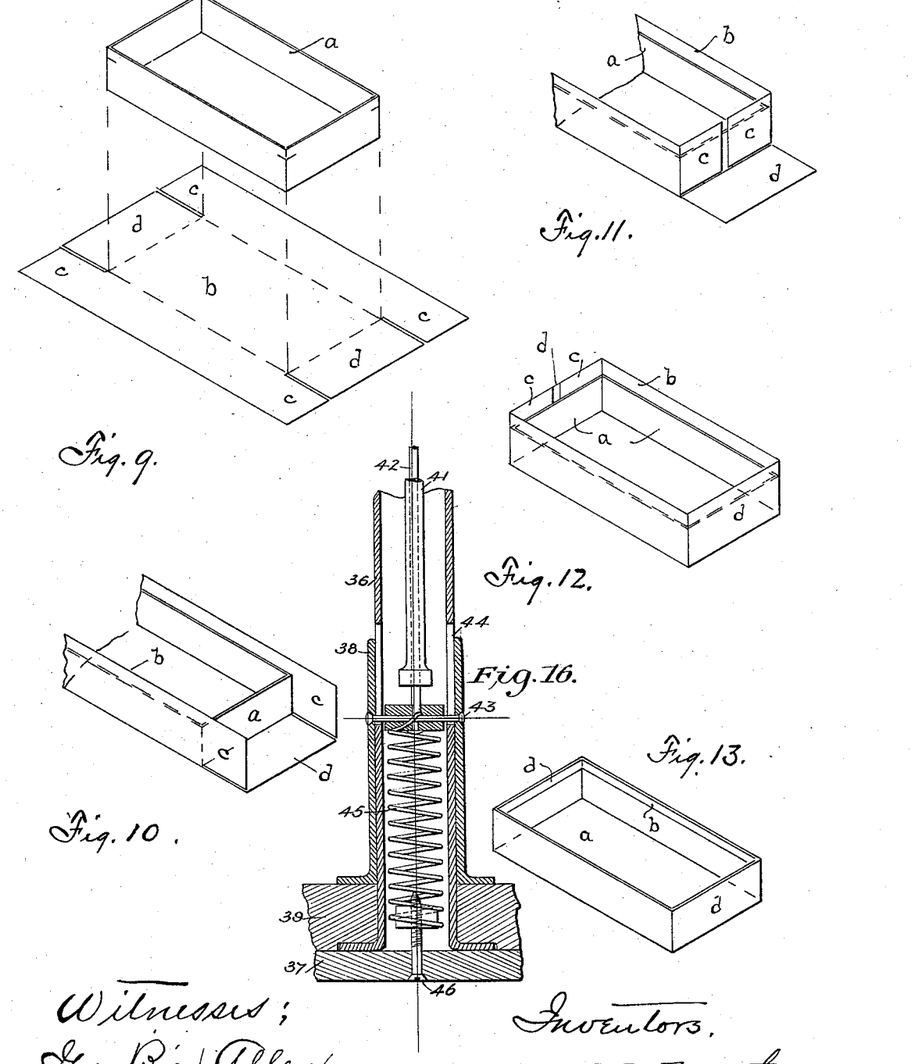
Figs. 9 to 13, inclusive, show the box and its covering material in various stages of the covering process.
Fig. 16 shows a vertical section, lengthwise of plunger, of a portion of plunger and tubes.

In operation the box, Fig. 2, is carried by the plunger down upon the covering material $b$, whose form is shown in Fig. 9, and whose upper surface is coated with paste or other adhesive. The pressure caused by spring 50 serves to lay the covering material smoothly upon the bottom of the box or the top of the cover, as the case may be. The position of the covering material upon the box is now fixed, so that no subsequent operation can possibly slip it out of place, and this is an essential matter, since the labels are already printed upon it. The presser-block 48 from this time presses the box firmly against the plunger, which, actuated by cam 29, presents the box in turn to the several covering devices about to be described.

Figure 1:
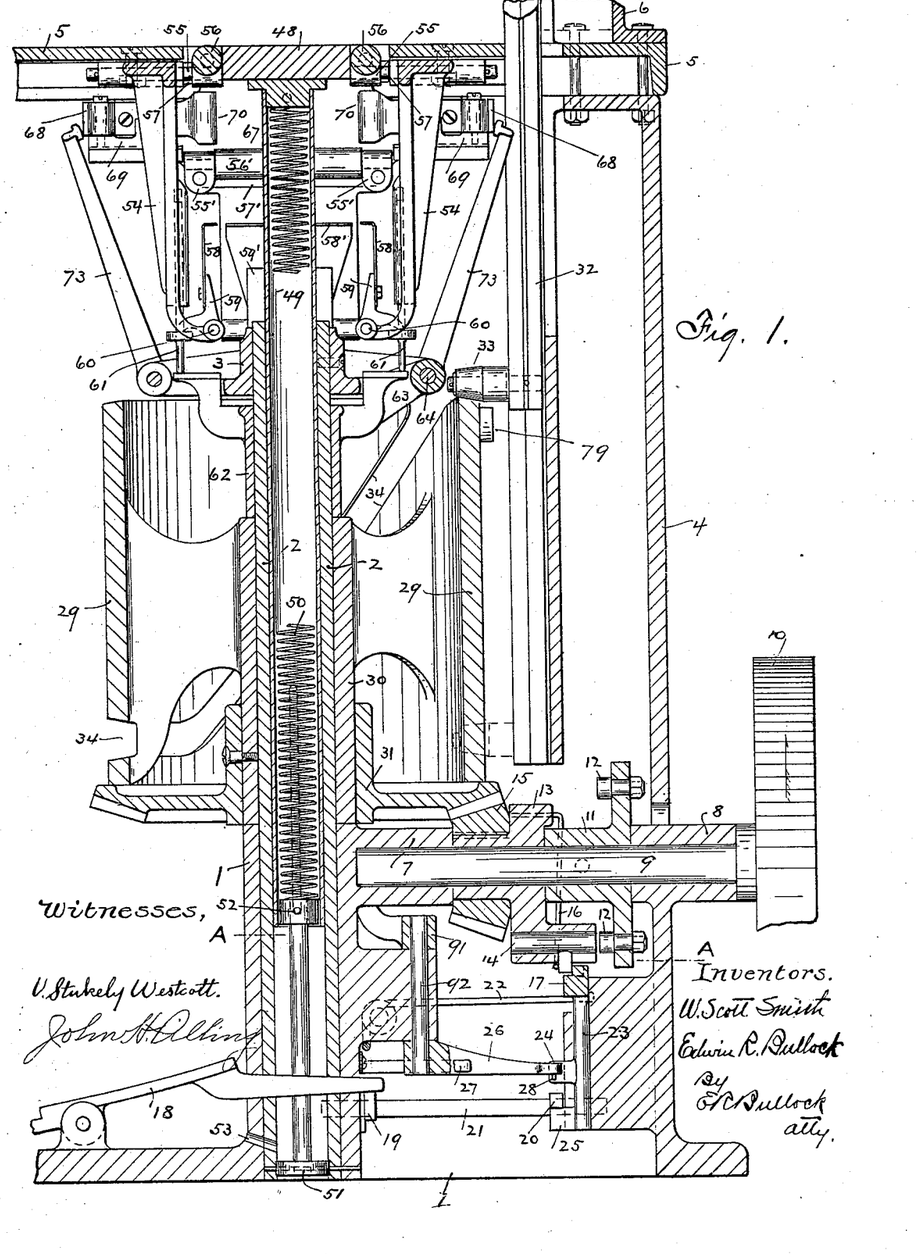
Figure 1 shows a vertical section through the lower part of the machine.
Figure 3:
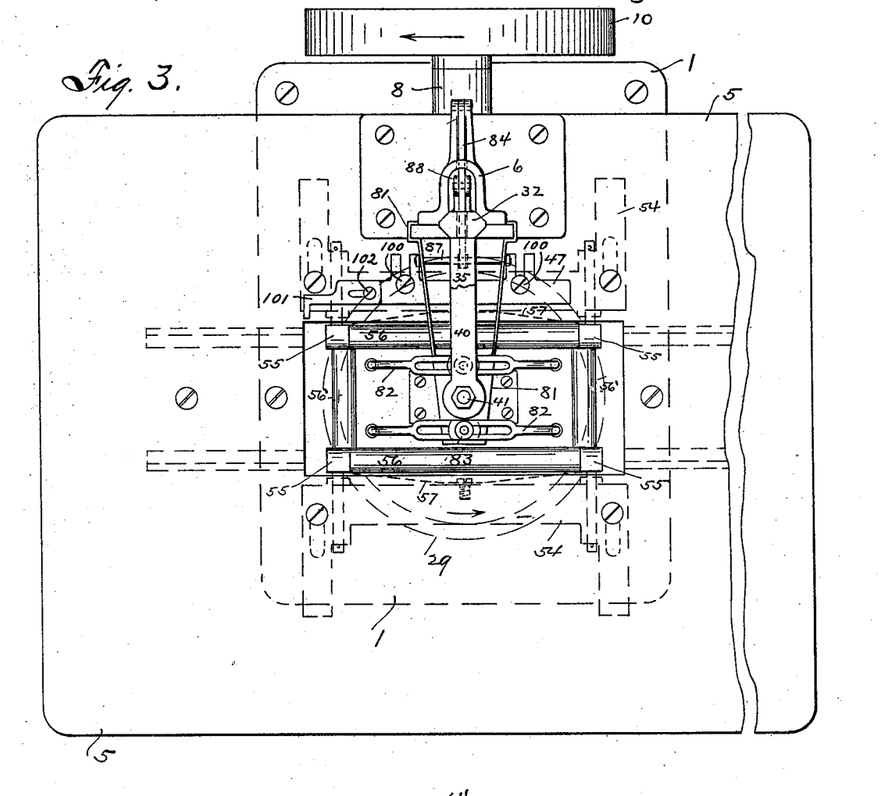
Fig. 3, a plan of the machine.

54 54, Figs. 1 and 3, are two oppositely-disposed side brackets adjustably secured to the under side of table and carrying the yielding bearings 55 55, in which turn the side rolls 56 56.

57 57 are springs.

Rolls 56 paste the covering material onto the sides of the box. Brackets 54 are forked at lower end and carry devices for turning the upper edges of covering material over into the box. Said devices consist of the adjustable and changeable turning-in pieces 58 58, angle-levers 59 59, rocking on pins 60 60. Said turning-in pieces 58, being slotted and secured by set-screws in said slots to angle-levers 59, are adjustable as to the depth of the box, while the open-end slot and set-screw provide means for quickly exchanging one set of turning-in pieces for another, one set serving for, perhaps, two or three sizes of box, the lifting-pins 61 61 working freely in brackets 54, receiving their motion from the four-armed sleeve 62, loosely splined upon the guide-tube 2 and receiving a short vertical movement through the two-armed lever 63, rocking upon the shaft 64 and carrying the antifriction-roll 65, which is struck and raised at each revolution of cam 29 by tappet 66, carried by said cam.

Figure 5:
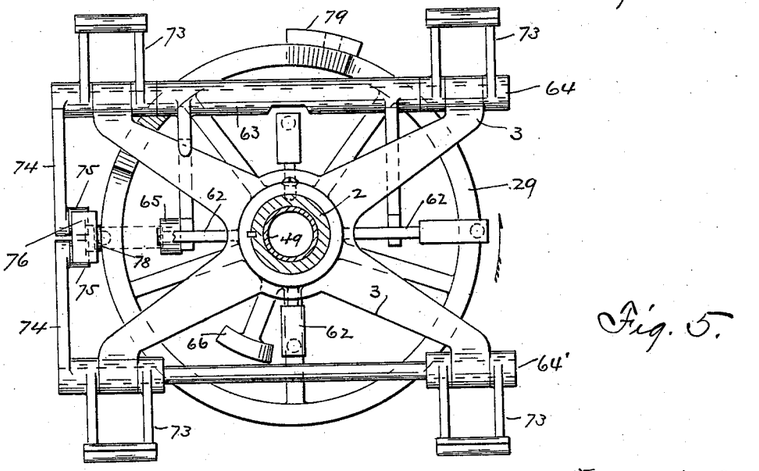
Fig. 5, a horizontal section just below the table with some parts omitted.
Figure 14:
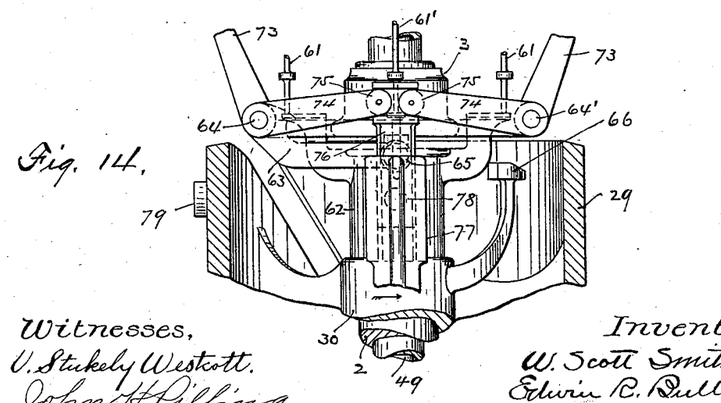
Fig. 14 is an end view of Fig. 5 partly in elevation and partly in section.

It will thus be seen that the tappet 66 raises the antifriction-roll 65, and from the construction this raises the two arms of lever 63. These lying just below two arms of the four-armed sleeve 62 raise said four arms, which impart motion to the four lifting-pins 61 61. One of the arms of lever 63, Figs. 5 and 14, is made to partly embrace an arm of frame 3 to keep roll 65 up to the path of tappet 66.

Figure 6:
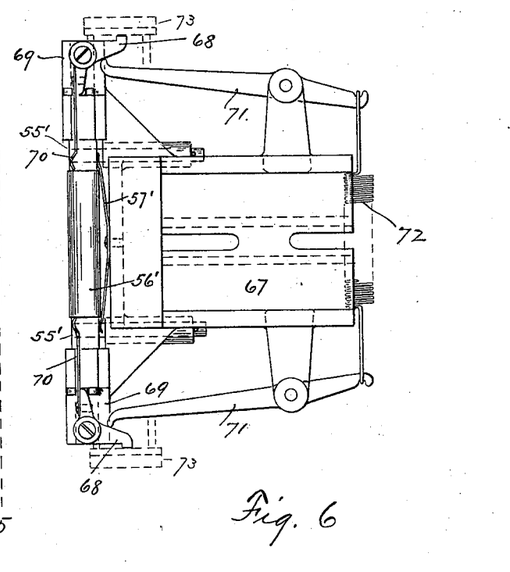
Figs. 6, 7, and 8 show a plan, an elevation, and a vertical section of one of the two forms of adjustable covering-device brackets secured in ways to the under side of table.
Figure 7:
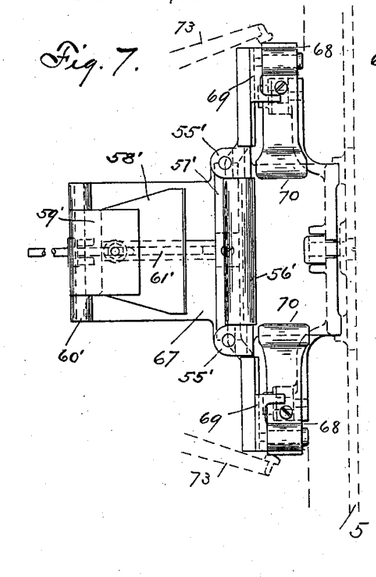
Figure 8:
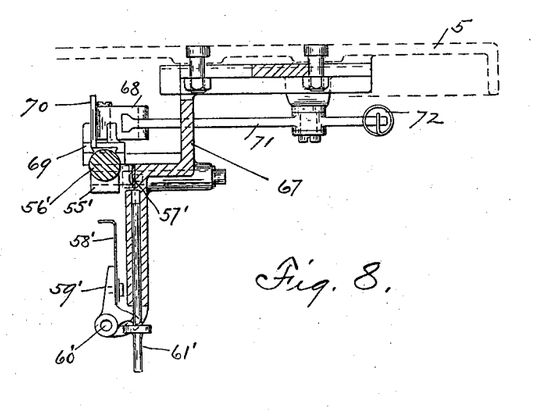

67 67, Figs. 6, 7, and 8, are two oppositely-disposed end brackets adjustably secured to the under side of table. They carry the end-covering devices, as follows: 68 68 are bell-cranks rocking upon studs fixed in slide-blocks 69 69, which work upon arms of the brackets 67. 70 70 are rubbing-strips, of metal or other suitable material, having one end formed to rub the side flaps c of the covering material onto the ends of the box and the other ends secured to the bell-cranks. Lugs on the slide-blocks limit the range of movement of the bell-cranks. 71 71 are levers fulcrumed to arms of the brackets 67, which are actuated by springs 72 72 to withdraw the rubbing-strips 70 from contact with the side flaps c after they are pasted onto the box and return said strips to the starting-point, where they are shown. 56′ 56′ are end rolls turning in yielding bearings 55′ 55′, carried by the brackets 67. 57′ 57′ are springs. 58′ 58′ are turning-in pieces adjustably secured to angle-levers 59′ 59′, rocking upon pins 60′ 60′, carried by the brackets 67. 61′ 61′ are lifting-pins. Turning-in pieces 58′, being slotted and secured by set-screws in said slots to angle-levers 59′ are adjustable as to the depth of the box, while the open end slot and set-screws provide means for quickly exchanging one set of turning-in pieces for another, one set serving for perhaps two or three sizes of box.

It is important that the rubbing-strips 70 be lifted from the covering material after it has been rubbed onto the ends of box. Otherwise their return stroke might draw the flaps c c off again, as the paste has not yet had time to set.

Rubbing-strips 70 are actuated while doing their work by the levers 73 73, whose arms are fixed to shafts 64 64′, rocking in bearings on the arms of spider 3. Lever-arms 74 74 carry antifriction-rolls 75 75, working in a groove in the upper end of connecting-rod 76, whose guide-piece 77 is fixed to the frame of the machine. The lower end of connecting-rod 76 carries the antifriction-roll 78, which is depressed at each revolution of the cam 29 by the tappet 79, fixed to the cam. By reference to Fig. 6 it will be seen that levers 73 have a greater leverage upon bell-cranks 68 than do levers 71, so that the rubbing-strips 70 are sure to exert a pressure upon the side flaps c as they are rubbed onto the ends of the box. The amount of pressure can be regulated by springs 72.

Figure 15:
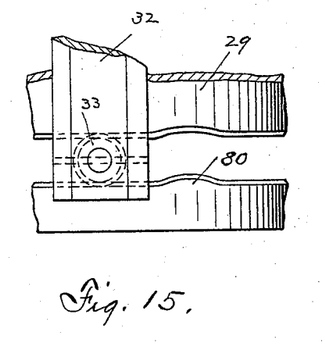
Fig. 15 shows a portion of the cam-groove.

Fig. 15 shows a portion of cam 29 (not elsewhere shown) in which the form of the groove at 80 imparts, through the connecting-rod 32, to the box a short upward motion just after the turning-in pieces 58 58′ have carried the upper edges of the covering material over into the box. This gives the covering material a set which it retains while the turning-in pieces withdraw and the follower 39 enters the box. The box now passes upward between the rolls for the second time, pasting these edges of covering material into the box. This completes the covering process.

To start the machine, as already stated, the cam 17 is depressed by treadle 18 through lever 21 and held by arm 26 below the path of bolt 14 during two out of three revolutions of the clutch.

Figure 4:
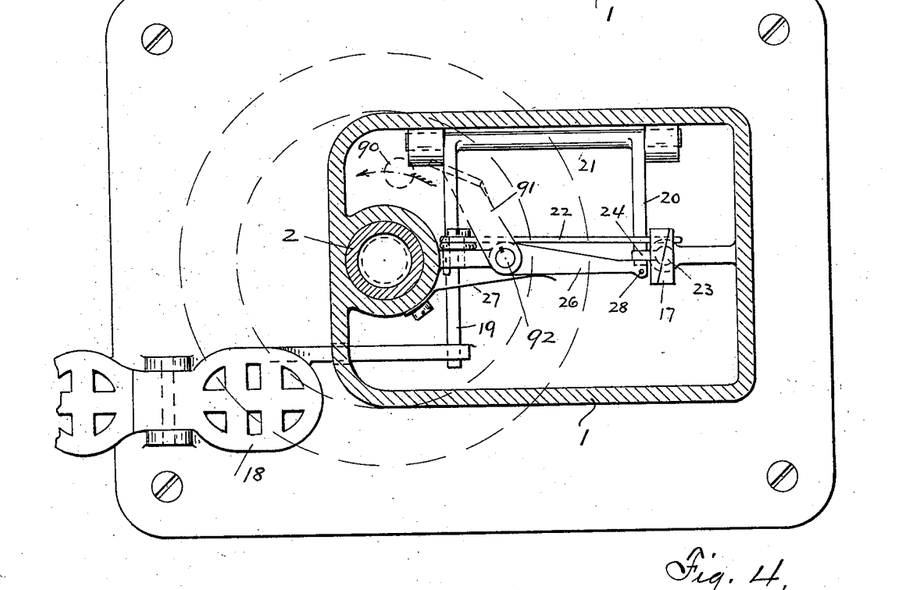
Fig. 4, a horizontal section of base at line A A of Fig. 1.

To stop the machine, cam 17 is released by the arm 26 just after the clutch has made its second revolution, and is raised by spring 22 into position to strike bolt 14 at its third revolution and so separate the clutch and stop the machine. To do this, the antifriction-roll 90, Fig. 4, carried by the bevel-gear 31, strikes the arm 91, keyed to shaft 92, and rocks the arm 26, also keyed to said shaft, out of the path of lug 24 on the cam-rod 23.

The knocking-off device only remains to be described, and is as follows:

81, Figs. 2 and 3, is a sliding frame adapted to work with a slight friction upon ways fixed to the upper guide-post 6.

82 82 are pins having shanks flattened, slotted, and bent at right angles to the pins. Said shanks are adjustably secured to frame 81 by thumb-nuts 83 83 upon screws passing through the slots in said shanks and through holes in the horizontal plate of frame 81. Pins 82 may thus be adjusted to knock off the various sizes of box.

84 is a lever fulcrumed to lugs on the upper guide-post 6 and connected to frame 81 by the link 85, the pin 86, and the bolt 87, which serves also to give the necessary friction to the sliding frame to hold it in that position upon the ways to which the connecting-rod 32 carries it.

88 shows one or more antifriction-rolls carried by lever 84.

89 is a lug carried by connecting-rod 32. Said rod is slotted near its upper end, as shown, to admit of lever 84 passing through it.

The knocking-off device acts thus: Fig. 2 shows its position before starting the machine and with a box upon the plunger. It will be seen that pins 82 are now up out of the way of the box, but when the connecting-rod 32 has descended through a portion of its stroke the upper end of its slot strikes lever 84 and carries it, together with the sliding frame and the pins 82, down to its knocking-off position just above the table, where it remains until it has removed the box from the plunger. The short remaining upward stroke of connecting-rod 32 is multiplied by lever 84, so that pins 82 are returned by it to their starting-point in readiness to repeat the operation.

The minor parts of the machine—such as bolts, pins, and screws, to which no number has been given—are understood as being included in the foregoing description.

In covering and ejecting a box the machine operates as follows, viz: A rough box is placed by hand or otherwise upon the plunger 37 39 and a piece of covering material $b$, freshly gummed, is laid, gummed side up, upon table 5 to the gage 47. The operator now touches the treadle 18, starting the cam 29, one revolution of which accomplishes the complete covering and ejecting of a box. The plunger now descends, bringing the bottom of the box or top of the cover down upon the gummed surface of covering material, which, before leaving the gage, is secured in proper position upon the box and cannot henceforth get out of place. The presser-block 48 presses the covering material smoothly upon the bottom of the box and holds the box firmly against the plunger in its subsequent positions. As the plunger continues to descend the box passes first between the yielding side rolls 56, which paste the covering material to the sides of the box. The box now stops in its descent long enough for the rubbing-pieces 70 to move forward and paste the side flaps of the covering material onto the ends of the box. They then withdraw and the box continues its descent, passing between the end rolls 56', which turn the center flaps up and paste them onto the ends of the box. The covering material now stands above the edge of the box and is turned over into the box by the turning-in pieces 58 58', the follower 39 having stopped in its descent at a point above said turning-in pieces, so as to be above the covering material when it is turned into the box. While the turning-in pieces are above the edges of box the latter is given a slight upward movement to crimp the covering material over the edge of box. The latter now drops a trifle, the turning-in pieces withdraw, and the plunger rises again to its starting-point. As it commences to rise the follower is overtaken and forced into the box by action of spring 45, completely turning the covering material over into the box. As the box continues to rise it passes again between the end and side rolls, which complete the pasting of covering material into the box and also give the outer surface of the box a second pressing. As the plunger nears the end of its return stroke the pins 82, which were lowered soon after the downstroke of plunger began by connecting-rod 32 striking lever 84, strike the bottom of the box as it is being raised and remove the box from the plunger by stopping its progress, while the plunger continues to rise. The pins are now returned to their first position (see Fig. 2) by reason of lug 89 striking rolls 88, carried by lever 84. The operation being completed the machine stops automatically, as described, and is ready to repeat the operation.

We therefore claim and desire to secure by Letters Patent of the United States—

1. A box-covering machine comprising a reciprocating plunger having two parts 37 and 39, a presser-block 48 reciprocated by said plunger, a pair of yielding side rolls, devices for turning side flaps onto ends of box, a pair of yielding end rolls, means for separating parts 37 and 39 of plunger, devices for turning covering material over edges of box, means for forcing follower 39 into box after turning-in devices have acted, framework to carry the moving parts, and the mechanism required to actuate them, substantially as shown and described.

2. A box-covering machine comprising a reciprocating plunger having two parts 37 and 39, a presser-block 48 reciprocated by said plunger, a pair of yielding side rolls, devices for turning side flaps onto ends of box, a pair of yielding end rolls, means for separating parts 37 and 39 of plunger, devices for turning covering material over edges of box, means for forcing follower 39 into box after turning-in devices have acted, a device for removing the completed box from the plunger, framework to carry the moving parts, and the mechanism required to actuate them, for the purpose specified.

3. In a box-covering machine, in combination, a two-part reciprocating plunger, means for separating said parts, means for reuniting said parts, a driving-cam 29, a connecting-rod adapted to communicate motion from said cam to said plunger, and a yielding presser-block 48, for the purpose specified.

4. In a box-covering machine in combination, a reciprocating plunger to carry and support the box, a yielding presser-block operated by said plunger to coöperate with the plunger in presenting the box to the covering devices, a pair of yielding side rolls, devices for turning the side flaps onto the ends of the box, and a pair of yielding end rolls.

5. In a box-covering machine in combination, a reciprocating plunger to carry and support the box, a yielding presser-block operated by said plunger to coöperate with the plunger in presenting the box to the covering devices, a pair of yielding side rolls, devices for turning the side flaps onto the ends of the box, a pair of yielding end rolls, and a knocking-off device in which two or more adjustable rods pass through corresponding holes in the plunger when near the end of its return stroke, substantially as shown and described.

6. In a box-covering machine, in combination, a two-part reciprocating plunger, means for retaining the upper part or follower above the turning-in devices while the other part of plunger is carried below them, devices for turning upper edges of covering material over into the box, means for forcing the plunger-follower into box above covering material, a pair of yielding end rolls, and a pair of yielding side rolls to act against ends and sides of plunger in pasting covering material into the box, all substantially as shown and for the purpose set forth.

In testimony whereof we affix our signatures in presence of two witnesses.

W. SCOTT SMITH.
EDWIN R. BULLOCK.

Witnesses:
 GEO. BION ALLEN,
 JOHN H. PILLING.